Patented Jan. 30, 1951

2,540,047

UNITED STATES PATENT OFFICE 2,540,047

CRYSTALLINE COMPLEXES OF STEROLS WITH OXIMES

Johannes Thomas Hackmann, Amsterdam, Netherlands, assignor to Shell Development Company, San Francisco, Calif., a corporation of Delaware No Drawing. Application October 28, 1947, Serial No. 782,685. In the Netherlands January 9, 1947

23 Claims. (Cl. 260—397.2)

This invention relates to crystalline complexes of sterols with oximes. More particularly, it relates to crystalline complexes formed between oximes and certain organic compounds.

The fractionation of mixtures of organic compounds has been carried out by a number of different methods. Where the mixture contains individual components having appreciably different boiling points suitable separation may be effected by fractional distillation. If the components of the mixture have specific solubility properties fractionation may be carried out by the use of solvent extraction procedures. Fractional crystallization may be utilized when the crystals so formed can be isolated in well defined and appropriate fractions. In many cases, however, the separation of closely allied isomers is difficult due to similarity of physical or chemical characteristics. If one or more components of the mixture is sensitive to thermal decomposition such processes as fractional distillation become impractical.

A recently developed method has been employed to a limited extent for the fractionation of petroleum hydrocarbons. This has comprised the formation of complexes between urea and a limited class of compounds, such as certain straight-chain hydrocarbons. The complexes so formed may be separated from the remaining components of a mixture and subsequently decomposed to yield the hydrocarbon and urea in their original forms. However, subsequent attempts to form crystalline complexes between organic compounds and a wide variety of nitrogenous substances somewhat related to urea in structure proved that the phenomenon is very specific. No theory has been evolved from which predictions may be made as to what compounds will perform satisfactorily as crystallizing agents.

It is an object of this invention to provide a new class of complex-forming agents. It is another object of this invention to provide a new class of crystalline complexes. It is a further object of this invention to provide a new process for the preparation of such complexes. Other objects will become apparent during the following discussion.

Now, in accordance with this invention, it has been found that oximes (including mineral acid salts thereof) form crystalline complexes with organic compounds. Moreover, still in accordance with this invention, it has been found that this phenomenon may be used in the fractionation of mixtures of organic compounds and in the isolation of particular compounds from natural or synthetic substances containing them. Again in accordance with this invention, it has been found that complexes of this type may be especially easily formed between oximes and polycyclic compounds such as those described hereinafter. Still in accordance with this invention, it has been found that a preferred process for the preparation of such complexes comprises dissolving the particular organic compound in a liquid medium containing or comprising an aldehyde or a ketone and subsequently adding hydroxylamine. By this process the oxime is formed in situ and immediately reacts with at least a portion of the other organic compounds present, particularly if they are of a polycyclic nature, to form crystalline complexes which may be separated from the other components of the reaction mixture.

The oximes useful in the preparation of the subject crystalline complexes have the preferred general configuration

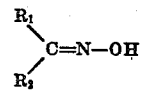

wherein $R_1$ is preferably a hydrogen atom or an alkyl or aryl group and $R_2$ is an alkyl or aryl group and are properly called C-hydrocarbon substituted methylidenoximes. It will be understood that the term "oxime" is meant to refer both to the free oxime and to the mineral acid salts thereof, such as the hydrochlorides. The oximes having the above configuration may be readily prepared by interaction of hydroxylamine with aldehydes or ketones. Suitable aldehydes for this purpose include the aliphatic saturated aldehydes such as formaldehyde, acetaldehyde, propionaldehyde, butyraldehyde, valeraldehyde, caproaldehyde, enanthaldehyde, nonaldehyde, palmitic aldehyde; aliphatic unsaturated aldehydes such as acrolein, crotonaldehyde, tiglic aldehyde; and aromatic aldehydes such as benzaldehyde, tolualdehyde, and cinnamaldehyde.

While the aldoximes are suitable for the preparation of many of the subject crystalline complexes, the preferred agents are the ketoximes. The latter are made by the reaction of various ketones with hydroxylamine. Suitable ketones for the preparation of ketoximes include the aliphatic saturated ketones such as acetone, 3-pentanone, butanone, 2-pentanone, 3-hexanone, 2-hexanone, and palmitone; the aliphatic unsaturated ketones such as phorone; and the aromatic ketones including acetophenone, propiophenone, butyrophenone, 1-phenyl-2-propanone, benzophenone, and 1,3-diphenyl-2-propanone.

The preferred group of ketoximes for use in operating the present invention comprise those wherein $R_1$ and $R_2$ of the above structural formula represent saturated alkyl groups having from one to about six carbon atoms, which may be named dialkylmethylidenoximes. These include especially dimethyl ketoxime, methyl ethyl ketoxime, diethyl ketoxime, methyl propyl ketoxime and methyl butyl ketoxime, which for most part are methyl alkyl methylidenoximes.

The crystalline complexes comprising a part of the present invention are most readily formed between oximes and polycyclic organic compounds. The oximes readily form crystalline complexes with a number of types of structures but particularly with polycyclic compounds, especially those of high molecular weight such as the steroids. Other crystalline complexes may be formed between oximes and polycyclic compounds such as phenanthrene and its homologs. Hence, the oximes are useful for the fractionation of coal tar mixtures, and thus may be utilized in the dye-stuffs industries. Furthermore, closely allied materials such as morphine, codeine and thebaine may be separated from natural and synthetic mixtures containing them by the process of the present invention. Other polycyclic compounds which form corresponding crystalline complexes include anthracene, chrysene, picene, etc. However, the most reactive group forming complexes with oximes are the steroids and especially the sterols, although suitable crystalline complexes also may be formed between oximes and the bile acids, sex hormones and saponins. The latter complexes are useful in pharmaceutical and biological applications and for the preparation of high potency pharmaceuticals from natural products.

While it has been found that the polycyclic compounds of the types referred to above are most suitable for the preparation of crystalline complexes with oximes, other types of compounds may be used as well. These include aliphatic and aromatic compounds preferably of relatively high molecular weight. Hydrocarbons, alcohols, acids and polysaccharides form typical crystalline complexes with certain oximes.

The complexes of the present invention may be formed by a number of suitable processes varying in detail according to the particular complex desired and to the mixture being treated. The oxime and other organic compound may be mixed at temperatures from about −20° to about +100° C. for periods ranging from several minutes to as long as several weeks, dependent upon the thermal sensivity of the mixture involved and upon the reactivity of the specific oxime and other organic compounds present. Preferably temperatures from about 25° to about 90° C. are employed and for practical purposes, whenever possible, reaction periods of about 1 to 60 minutes are used.

The complexes may be formed in the presence or absence of solvents. For example, solid organic compounds may be heated with an oxime and maintained in a liquid state until the crystalline complexes so formed have been separated therefrom. Alternatively, organic compounds and oximes may be dissolved in solvents such as isooctane or similar branched chain alkanes. An especially preferred process comprises the use of a ketone or aldehyde as the reaction medium, to which is added hydroxylamine and a polycyclic organic compound. Thereby the ketone or aldehyde forms an oxime in situ which subsequently reacts with the polycyclic compound present. Suitable media of this variety include especially acetone and methyl isobutyl ketone.

The quantity of oxime required for formation of the desired crystalline complexes varies somewhat according to the nature of the oxime and of the complex to be produced. In most cases the complex contains approximately one molecule of the oxime for every molecule of the other organic compound. However, when oximes are used in the form of their salts other addition products are frequently found to form in which the ratio of organic compounds to oxime is approximately two to one.

The crystalline complexes which may be prepared and isolated as described above are well defined products having sharp melting points but which may be decomposed with relative ease to recover the oxime in its original form and a particular fraction of the mixture of organic compounds treated therewith. Regeneration procedures useful for the decomposition of these complexes include warming in the presence of water, steam distillation, warming in the presence of a solvent other than water which is a non-solvent for the oxime, dry heating and heating in the presence of an inert hot gas such as nitrogen or hydrogen.

The whole process of the present invention comprising formation of the oxime, addition thereof to the mixture of organic compounds, separation of a crystalline complex as described and subsequent decomposition of the complex may be carried out as a batch process or, more preferably, in a continuous or semi-continuous system. The latter alternative is preferred because certain inherent advantages accrue which cannot be obtained by the use of batch processes. These include a more rapid formation of crystalline complexes and other advantages such as a more pure product and lower reaction temperatures.

The present process may be utilized for the separation of mixtures, since the complexes are formed and crystallize at definite temperatures or under other specific conditions, dependent upon their specific identity. For example, coal tar mixtures containing a number of polycyclic compounds including anthracine may be mixed with dimethyl ketoxime in the presence of an inert solvent such as isooctane. Under these conditions at room temperature a crystalline complex forms between one of the coal tar components but the others remain unchanged. Subsequent to separation of the complexes so formed the reaction mixture may be heated to a more elevated temperature with dimethyl ketoxime and complexes thus formed between other members of the original mixture. Alternate periods of heating and separation may be employed to fractionate the mixture into any number of desired components.

The following example is presented to illustrate the process of the present invention but is to be understood as a specific embodiment thereof and not to be limiting in any degree.

*Example*

To 200 parts of a solution containing 2.5% cholesterol in acetone is added 0.8 part hydroxylamine hydrochloride dissolved in a minimum amount of water. The reaction mixture is allowed to stand at room temperature for a short time, upon which a complex crystallizes having the form of large needles with a melting point of 147° C. The complex has a cholesterol content of 94.4%. Upon warming the crystals with water to a temperature of about 100° C., decomposition occurs and cholesterol is separated from the crystallizing agent, namely dimethyl ketoxime hydrochloride.

The same addition product may be obtained by first preparing the dimethyl ketoxime hydrochloride and subsequently causing this to react with cholesterol.

I claim as my invention:

1. As a new composition of matter, the crystalline molecular complex of dimethyl ketoxime with cholesterol.

2. A method of isolating sterol from crude solutions thereof, said solutions also containing other substances of diverse character which accompany said sterol in their crude solutions, which comprises subjecting said solution to the action of a hydrocarbon oxime, allowing crystalline molecular complexes to form between said sterol and oxime, and isolating said complexes.

3. A method of isolating sterols from crude solutions thereof, said solutions also containing other substances of diverse character which accompany sterol substances in their crude solutions, which comprises subjecting said solution to the action of a hydrocarbon ketoxime, allowing crystalline molecular complexes to form between said sterol and ketoxime, and isolating said complexes.

4. A method of isolating cholesterol from solutions thereof which comprises subjecting said solution to the action of dimethyl ketoxime, allowing a crystalline molecular complex to form between cholesterol and dimethyl ketoxime, and isolating said complex.

5. A method of isolating sterols from crude solutions thereof, said solutions also containing other substances of diverse character which accompany sterol substances in their crude solutions, which comprises subjecting said solution to the action of a saturated aliphatic ketoxime, the alkyl substituents of which have from 1 to 6 carbon atoms, allowing crystalline molecular complexes to form between said sterol and ketoxime, and isolating said complexes.

6. As new compositions of matter, the crystalline molecular complexes of hydrocarbon ketoximes and sterols.

7. As new compositions of matter, the crystalline molecular complexes of hydrocarbon oximes with cholesterol.

8. As new compositions of matter, the crystalline molecular complexes of hydrocarbon oximes with sterols.

9. A method of isolating cholesterol from solutions thereof which comprises subjecting said solution to the action of a methyl alkyl methylidenoxime wherein the alkyl group contains from 1 to 6 carbon atoms, allowing a crystalline molecular complex to form between cholesterol and said methyl alkyl methylidenoxime and isolating said complex.

10. A method of separating cholesterol from a solution thereof which comprises intimately contacting said solution with a saturated dialkyl ketoxime, the alkyl substituents of which have from 1 to 6 carbon atoms, to form a crystalline molecular complex between cholesterol and said ketoxime, forming said complex and separating said complex from the resulting admixture.

11. A method of separating cholesterol from a solution thereof which comprises, intimately contacting said solution with a hydrocarbon oxime containing from 1 to 16 carbon atoms to form a crystalline molecular complex with cholesterol, forming said complex and separating said complex from the resulting admixture.

12. As a new composition of matter, a crystalline molecular complex of cholesterol and a methyl alkyl methylidenoxime wherein the alkyl group contains from 1 to 6 carbon atoms.

13. As a new composition of matter, a crystalline molecular complex of cholesterol and a dialkyl ketoxime, the alkyl substituents of which have from 1 to 6 carbon atoms.

14. As a new composition of matter, a crystalline molecular complex of cholesterol and a hydrocarbon oxime containing from 1 to 16 carbon atoms.

15. As a new composition of matter a crystalline molecular complex of a sterol and a saturated aliphatic hydrocarbon oxime, the alkyl substituents of which have from 1 to 6 carbon atoms.

16. As a new composition of matter a crystalline molecular complex of a sterol and a saturated aliphatic hydrocarbon oxime containing from 1 to 16 carbon atoms.

17. As a new composition of matter a crystalline molecular complex of a sterol and a mineral acid salt of a saturated aliphatic hydrocarbon oxime containing from 1 to 16 carbon atoms.

18. As a new composition of matter a crystalline molecular complex of a sterol and a saturated aliphatic hydrocarbon oxime wherein the molar ratio of oxime to sterol is between 1:1 and 1:2.

19. As a new composition of matter a crystalline molecular complex of a sterol and a methyl alkyl methylidene oxime, wherein the alkyl group contains from 1 to 6 carbon atoms.

20. As a new composition of matter a crystalline molecular complex of a sterol and a hydrocarbon oxime containing from 1 to 16 carbon atoms.

21. A method of isolating sterols from crude solutions thereof, said solutions also containing other substances of diverse character which accompany said sterols in their crude solutions which comprises subjecting said solution to the action of a hydrocarbon oxime at a temperature of between $-25°$ and $+100°$ C., allowing crystalline molecular complexes to form between said sterols and oxime and isolating said complexes.

22. A method of isolating sterols from crude solutions thereof, said solutions also containing other substances of diverse character which accompany said sterols in their crude solutions, which comprises subjecting said solutions to the action of a hydrocarbon oxime at a temperature of $+25°$ to $+90°$ C. for a period between 1 and 60 minutes, allowing crystalline molecular complexes to form between said sterols and oxime and isolating said complexes.

23. A method of isolating sterols from mixtures containing the same dissolved in an aliphatic ketone, which comprises adding hydroxylamine to said sterols and ketone so as to form an aliphatic ketoxime, allowing crystalline molecular complexes to form between said sterols and said ketoxime and isolating said complexes.

JOHANNES THOMAS HACKMANN.

REFERENCES CITED

The following references are of record in the file of this patent:

UNITED STATES PATENTS

| Number | Name | Date |
| --- | --- | --- |
| 2,103,735 | Schoeller | Dec. 28, 1937 |
| 2,188,881 | Butenandt | Jan. 30, 1940 |
| 2,200,307 | Schoeller | May 14, 1940 |
| 2,362,605 | Yoder | Nov. 14, 1944 |

OTHER REFERENCES

Jolles: Chem. Abst., vol. 33, column 9300 (1939).